United States Patent Office 3,223,737
Patented Dec. 14, 1965

3,223,737
PREPARATION OF PHOSPHINES AND
PHOSPHONIUM HALIDES
Leo C. D. Groenweghe, St. Louis, Mo., assignor to Monsanto Company, a corporation of Delaware
No Drawing. Filed Sept. 5, 1962, Ser. No. 221,449
16 Claims. (Cl. 260—606.5)

This application is a continuation-in-part of my copending patent application, Serial No. 843,616, filed October 1, 1959, now abandoned.

This invention relates to a novel process for preparing phosphines. More particularly it relates to a novel process for preparing phosphines by dehalogenating halophosphines.

According to this invention, phosphines are prepared by reacting an organic halophosphine with hydrogen sulfide, whereby the halogen atoms of the halophosphine are replaced by hydrogen atoms. The general reaction of this invention can be presented schematically as follows:

(Eq. I)  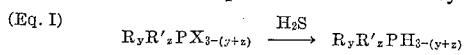

wherein R and R' are either hydrogen or organic radicals attached to the phosphorus atom through a carbon/phosphorus bond, wherein X is a halogen atom (preferably chlorine, bromine or iodine), wherein $y$ and $z$ are integers between 0 and 2, inclusive, and wherein the sum of $y$ and $z$ is either 1 or 2, and at most one of R and R' is hydrogen.

The process is applicable to the preparation of primary phosphines (e.g., reaction of methyldichlorophosphine with $H_2S$), or secondary phosphines (e.g., reaction of diphenylchlorophosphine with $H_2S$). In the case of the secondary phosphines, the organic radicals R and R' may be either identical or different radicals.

When R and R' in Equation I, above, are organic radicals, they can be unsubstituted hydrocarbyl radicals or substituted hydrocarbyl radicals. They can be branched or unbranched to practically any degree, can be acetylenically as well as ethylenically unsaturated, and can ordinarily contain from 1 to about 30 carbon atoms, although it is preferred that they contain from 1 to 20 carbon atoms, and that they be either hydrocarbyl or halogen-substituted hydrocarbyl radicals, particularly when the halogen is substituted at carbon atoms other than terminal carbon atoms. Still further preferred are those radicals that are alkyl, aryl, alkaryl or aralkyl and even more particularly, lower alkyl in nature. R and R' can be either aliphatic or cyclic (either aromatic or alicyclic), and can contain heterocyclic, monocyclic hydrocarbyl, polycyclic hydrocarbyl and substituted cyclic and polycyclic hydrocarbyl radicals (whether the rings thereof are saturated or not), although, of the cyclic radicals, the aromatic and alicyclic hydrocarbyl radicals are preferred. Still further preferred are those radicals which are inert to $H_2S$; that is, which will not ordinarily react with $H_2S$ and are otherwise stable in the presence of $H_2S$ under the conditions at which the processes of the present invention are performed. Typical of the substituents that R and R' can contain are the halides (including fluoride, chloride, bromide and iodide), either groups, thioether groups, nitrile groups and the like. Actually, the processes of the present invention can be practiced successfully upon any primary or secondary halophosphine that can, itself, be manufactured.

Typical examples of halophosphines which can be dehalogenated according to this invention are ethyldichlorophosphine,
n-propylchlorobromophosphine,
sec-butyldibromophosphine,
i-amylbromoiodophosphine,
n-hexyldichlorophosphine,
2-ethylhexyldifluorophosphine,
n-dodecyldiiodophosphine,
cyclohexylchlorofluorophosphine,
phenyldichlorophosphine,
tolyldibromophosphine,
xylylbromofluorophosphine,
α-naphthyldichlorophosphine,
indanyldichlorophosphine,
benzylbromoiodophosphine,
propenyldichlorophosphine,
oleyldichlorophosphine,
β-chloroethyldichlorophosphine,
p-bromophenyldibromophosphine,
dimethylchlorophosphine,
methyl-i-propylbromophosphine,
2-ethylhexylphenylfluorophosphine,
diphenylchlorophosphine,
benzyl-t-butylchlorophosphine,
di-β-fluorethylbromophosphine,
β-chloroethyl-ethyl-chlorophosphine,
methyl-β-pyridyliodophosphine, etc.

While X is a halogen in Equation I, above, it is preferred that X represent either chlorine, bromine or iodine. Still further preferred, for economic as well as other reasons, is chlorine.

The dehalogenation reaction of this invention is accompanied by the formation of very low molecular weight polymeric (mostly dimeric or trimeric) phosphorus-sulfur compounds—the particular structure of these compounds being dependent upon whether primary or secondary phosphines are being produced. For example, when producing primary phosphines, the reaction probably proceeds primarily according to the following equation:

(Eq. II) 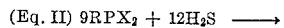

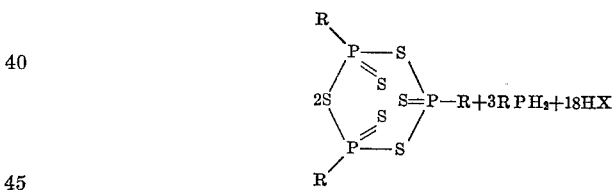

When producing secondary phosphines, the reaction probably proceeds as follows:

(Eq. III) 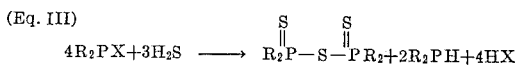

The conversion of halophosphines to the corresponding nonhalogenated phosphines can be improved somewhat by carrying out the reaction in the presence of a sulfur acceptor, such as triphenylphosphite. The presence of such sulfur acceptors results in less of the halophosphine being converted to polymeric by-product, and more to the desired phosphine product.

When producing the primary and secondary phosphines, the phosphine product will generally be formed initially as a phosphonium halide (e.g., as methylphosphonium chloride when carrying out the reaction of Equation II, above). In many respects, the formation of the phosphonium salt simplifies the reaction in that the phosphonium salt is less volatile and generally more easily collected than the phosphine. The recovery or regeneration of phosphine from phosphonium halide is also an easy matter. In the case of primary phosphines, the hydrohalide is simply mixed with water. The phosphonium salt dissociates to the phosphine and the hydrogen halide, the latter being soluble in water. The phosphine is not water-soluble and, depending upon its volatility either passes off as a gas or froms a separate water-immiscible liquid layer. The procedure is essentially the same with the recovery or regeneration of secondary phosphines, except that alkaline (rather than neutral) aqueous solutions are often required to effect dissociation of the corresponding secondary phosphonium halide.

In many instances the phosphine may be left in the form of its phosphonium halide and be stored, handled, shipped and/or ultimately utilized in that form without ever separating the phosphine as such. For that reason, when the present disclosure and claims refer to the preparation of phosphines, they are not intended to be limited only to the preparation of the pure phosphine itself, but are intended to include as well the preparation of the phosphines in the form of the corresponding phosphonium halides.

Because of the desirability of recovering the immediate product resulting from the reaction of $H_2S$ with the halophosphine (i.e., the phosphonium halide, $$[R_yR'_zPH_{4-(y+z)}]X)$$

from the reaction zone, it is preferred that the reaction with $H_2S$ be performed under conditions such that the phosphonium halide is evolved from the reaction mixture (of $H_2S$, halophosphine, and by-product polysulfide material) in the form of a gas. In this manner, the phosphonium halide can be either collected conveniently (for example, in a conventional cold trap, or on a conventional condenser) or reacted directly with water to yield the corresponding phosphine. Since the phosphonium halide products from the reaction of $H_2S$ with halophosphines are ordinarily considerably more volatile than their corresponding halophosphines, the evolution of the phosphonium halide can readily be accomplished by adjusting the reaction temperature and the pressure on the reacting system so that the phosphonium halide is evolved from the reaction mixture while the halophosphine "raw" material remains behind. The particular conditions of temperature and pressure that yield optimum results will depend upon the physical properties of the particular phosphine or phosphonium halide being manufactured, as well as those of the halophosphine "raw" material.

The reactions of this invention are carried out at temperatures elevated somewhat above room temperatures. In general, the reactions are carried out at temperatures between about 50° C. and about 500° C. and preferably between about 70° C. and about 200° C. The higher temperatures are more advantageous in that reaction takes place more rapidly with increasing temperature. At these higher temperatures (at which the processes of the present invention are ordinarily carried out to greatest advantage) the hydrogen sulfide is generally introduced into the presence of the hot halophosphine "raw" material in the form of a gas, although the $H_2S$ can be introduced into the reaction mixture in the liquid or solid state, as well. The only significant upper limitation upon temperature is that it should not be so high as to cause appreciable decomposition of organic radicals present in the compounds.

Further details with respect to the practice of the present invention will be apparent from the following examples:

Example I

Thirty-three grams of liquid methydichlorophosphine are placed in a 100 liter stirred flask equipped with a tube for introducing $H_2S$ into the vapor space over the liquid. The flask is also equipped with an acetone-Dry Ice reflux cooler maintained at about −25° C. After the methyldichlorophosphine is introduced, the system is flushed with nitrogen and the halophosphine heated to reflux temperature (about 75° C.). Gaseous $H_2S$ is dried (by passing over phosphorus pentoxide) and passed into the reaction flask at a rate of about 1 ml. per second while the liquid phase is continuously agitated with the stirrer. Reaction is continued for a period of about 12 hours, during which time the liquid temperature is raised from about 75° C. to about 150° C.

The product methylphosphonium chloride is passed over a cold surface, preferably a chill wheel equipped with a scraper to continuously remove the methylphosphonium halide that condensed thereon. Methylphosphine is readily released from the methylphosphonium chloride by mixing with water—whereupon HCl dissolves in the water and the methylphosphine is released as a gas.

Example II

Into a conventional glass-lined reaction vessel fitted with a fairly efficient stirrer and an external condenser are introduced 1,000 parts by weight of ethyldichlorophosphine. The condenser is cooled to about −30° C. with a Dry-Ice acetone mixture. The ethyldichlorophosphine is heated to about 80° C. and maintained at about this temperature while, over a period of about 5 hours, 500 parts by weight of hydrogen sulfide gas is gradually introduced into the liquid phase, through the bottom of the reaction vessel. During the introduction of the $H_2S$, product monoethylphosphonium chloride is evolved from the reaction vessel and collected in the condenser. The condenser is periodically scraped to remove the collected monoethylphosphonium chloride which, upon subsequent contact with liquid water decomposes to yield gaseous monoethylphosphine.

Examples I and II, above, illustrate preferred embodiments of the processes of this invention which can be utilized to particular advantage in the manufacture of such products as the monophenylphosphonium halides and monophenylphosphine, the monomethyl and dimethyl phosphonium halides and the mono- and dimethylphosphines, the mono- and diethylphosphonium halides and phosphines, and the like. When the relatively higher molecular weight phosphonium halides and phosphines are manufactured, it is often advantageous (although not necessary) to carry out the reaction of the appropriate halophosphine with $H_2S$ under pressures higher than atmospheric.

What is claimed is:

1. A process which comprises reacting together $H_2S$ and a halophosphine of the class $R_yR'_zPX_{3-(y+z)}$, wherein R and R' are selected from the group consisting of hydrogen and organic radicals and at most one of R and R' is hydrogen, said organic radicals which are inert to $H_2S$ being attached to the phosphorus atom through a carbon/phosphorus bond, X is halogen, y and z are integers from 0 to 1 and the sum of y and z is from 1 to 2, to produce a phosphonium halide corresponding to said halophosphine, and thereafter intermixing said phosphonium halide with water to produce a phosphine of the class $R_yR'_zPH_{3-(y+z)}$.

2. A process for manufacturing a phosphonium halide of the class $[R_yR'_zPH_{4-(y+z)}]X$, which process comprises reacting together at a temperature between about 50° C. and about 500° C. $H_2S$ and a halophosphine of the class $R_yR'_zPX_{3-(y+z)}$; wherein R and R' are aliphatic radicals which are inert to $H_2S$ and are attached to the phosphorus atom through a carbon/phosphorus bond, X is a halogen selected from the group consisting of chlorine, bromine and iodine, and y and z are integers from 0 to 1, and the sum of y and z is an integer from 1 to 2; and recovering said phosphonium halide from the reaction zone.

3. A process for manufacturing a primary phosphonium halide, which process comprises the steps of heating with $H_2S$ at a temperature between about 50° C. and about 500° C. a halophosphine selected from the group capable of being represented by a formula selected from the group consisting of $RPX_2$ and $RPXH$; wherein R is an aliphatic radical which is inert in the presence of $H_2S$ at said temperature and is attached to the phosphorus atom through a carbon/phosphorus bond, and X is a halogen selected from the group consisting of chlorine, bromine and iodine; and recovering said primary phosphonium halide from the reaction zone.

4. A process for manufacturing a primary phosphine of the class $RPH_2$, which process comprises the steps of heating with $H_2S$ a halophosphine selected from the group consisting of those capable of being represented by a formula selected from the group consisting of $RPX_2$ and $RPXH$; wherein R is a hydrocarbyl radical which is inert to $H_2S$, is attached to the phosphorus atom through a carbon/phosphorus bond and contains from 1 to 10 carbon atoms, and X is a halogen selected from the group consisting of chlorine, bromine and iodine; whereby a phosphonium halide corresponding to said phosphine is produced; recovering said phosphonium halide and contacting said phosphonium halide with water; said heating being conducted at a temperature between about 50° C. and about 500° C. and under such conditions that said phosphonium halide is evolved as a gas.

5. A process for manufacturing a primary lower alkyl phosphonium halide, which process comprises intermixing $H_2S$ with a primary lower alkyl halophosphine at a temperature of from about 70° C. to about 200° C. under conditions such that said phosphonium halide is evolved from the reaction zone in the form of a gas, and condensing said phosphonium halide on a cold surface.

6. A process as in claim 5, wherein said primary lower alkyl halophosphine is methyldichlorophosphine.

7. A process as in claim 5, wherein said primary lower alkyl halophosphine is ethyldichlorophosphine.

8. A process as in claim 5, wherein said primary lower alkyl halophosphine is butyldichlorophosphine.

9. A process for manufacturing monophenylphosphine, which process comprises forming a mixture by intermixing $H_2S$ with phenyldichlorophosphine at a temperature between about 70° C. and about 200° C., refluxing said mixture under about 1 atmosphere of pressure; whereby monophenylphosphonium chloride is evolved from said mixture; and intermixing said monophenylphosphonium chloride with water.

10. A process for manufacturing a secondary phosphonium halide, which process comprises the steps of forming a mixture by intermixing with $H_2S$ at a temperature between about 50° C. and about 500° C. a secondary halophosphine; said secondary halophosphine containing two aliphatic radicals which are attached to the phosphorus atom through a carbon/phosphorus bonds and which are inert in the presence of $H_2S$ at said temperature; and recovering said secondary phosphonium halide from said mixture.

11. A process for manufacturing a secondary phosphonium halide, which process comprises forming a mixture by intermixing with $H_2S$ a secondary chlorophosphine; said chlorophosphine having two hydrocarbyl radicals which are inert in the presence of $H_2S$ at a temperature below about 200° C., and which contain from 1 to 20 carbon atoms; subjecting said mixture to a temperature of from about 70° C. to about 200° C., and recovering said secondary phosphonium halide from said mixture.

12. A process for manufacturing a secondary lower alkyl phosphonium halide, which process comprises subjecting a mixture of $H_2S$ with a secondary lower alkyl halophosphine to a temperature between about 70° C. and about 200° C. under conditions such that said phosphonium halide is evolved as a gas from the heating zone, and condensing said phosphonium halide on a surface having a temperature below the condensation point of said phosphonium halide; said halide being selected from the group consisting of chloride, bromide and iodide.

13. A process as in claim 12, wherein said phosphonium halide is contacted with water.

14. A process as in claim 12, wherein said secondary lower alkyl halophosphine is diethylchlorophosphine.

15. A process as in claim 12, wherein said secondary lower alkyl halophosphine is selected from the group consisting of dimethylchlorophosphine, dimethylbromophosphine and dimethyliodophosphine.

16. A process as in claim 15, wherein said secondary lower alkyl halophosphine is dimethylchlorophosphine.

References Cited by the Examiner

Kosolapoff: Organophosphorus Compounds, John Wiley & Sons, Inc., New York (1950), pp. 10, 11, 24, 30 and 53.

TOBIAS E. LEVOW, *Primary Examiner*.

OSCAR R. VERTIZ, *Examiner*.